US006765025B2

(12) United States Patent
Ding et al.

(10) Patent No.: US 6,765,025 B2
(45) Date of Patent: Jul. 20, 2004

(54) PROCESS FOR DIRECT SYNTHESIS OF DIESEL DISTILLATES WITH HIGH QUALITY FROM SYNTHESIS GAS THROUGH FISCHER-TROPSCH SYNTHESIS

(75) Inventors: Yunjie Ding, Liaoning (CN); Wenping Ma, Liaoning (CN); Yuan Lu, Liaoning (CN); Liwu Lin, Liaoning (CN)

(73) Assignee: Dalian Institute of Chemical Physics, Chinese Academy of Science, Dalian (CN)

( * ) Notice: Subject to any disclaimer, the term of this patent is extended or adjusted under 35 U.S.C. 154(b) by 120 days.

(21) Appl. No.: 10/052,485

(22) Filed: Jan. 17, 2002

(65) Prior Publication Data

US 2003/0134912 A1 Jul. 17, 2003

(51) Int. Cl.[7] .............................................. C07C 27/00
(52) U.S. Cl. ...................................... 518/715; 518/700
(58) Field of Search .................................. 518/700, 715

(56) References Cited

U.S. PATENT DOCUMENTS

| | | | |
|---|---|---|---|
| 4,460,710 A | * 7/1984 | Sapienza et al. ............ 518/700 |
| 4,478,954 A | 10/1984 | Connolly et al. |
| 4,542,122 A | 9/1985 | Payne et al. |
| 4,579,986 A | 4/1986 | Sie |
| 4,992,159 A | 2/1991 | Cody et al. |
| 4,992,406 A | 2/1991 | Mauldin et al. |
| 5,324,335 A | 6/1994 | Benham et al. |
| 5,378,348 A | 1/1995 | Davis et al. |
| 5,522,983 A | 6/1996 | Cash et al. |
| 5,689,031 A | 11/1997 | Berlowitz et al. |
| 6,274,029 B1 | 8/2001 | Wittenbrink et al. |
| 6,296,757 B1 | * 10/2001 | Wittenbrink et al. ......... 208/15 |
| 6,369,286 B1 | * 4/2002 | O'Rear ....................... 585/644 |

FOREIGN PATENT DOCUMENTS

| | | |
|---|---|---|
| EP | 0 153 782 B1 | 9/1985 |
| EP | 0 153 782 A1 | 9/1985 |
| EP | 0 515 270 A1 | 11/1992 |
| EP | 0 515 270 B1 | 11/1993 |
| GB | 1 499 570 | 2/1978 |
| JP | 2302561 A | 12/1990 |
| WO | WO 94/28095 | 12/1994 |
| WO | WO 97/21787 | 6/1997 |

OTHER PUBLICATIONS

P.M. Morgan et al., "Some Comparative Chemical, Physical and Compatibility Properties of Sasol Slurry Phase Distillate Diesel Fuel," *SAE The Engineering Resource For Advancing Mobility*, International Fall Fuels and Lubricants Meeting, San Francisco, CA, 11 pgs. (1998).

"Fischer–Tropsch Wax Characterization and Upgrading: Final Report," DE88–014638 prepared by UOP, Inc. and Allied–Signal Engineered Materials Research Center, *U.S. Department of Commerce National Technical Information Service* work performed under Contract No. AC22–85PC80017 (1988).

J.E. Weber, Jr., "Testing of Aftermarket Products," *SAE The Engineering Resource For Advancing Mobility*, West Coast International Meeting & Exposition, San Diego, California pp. 1–7 (1984).

M.A. Agee, "Economic Gas to Liquids Technologies–A New Paradigm for the Energy Industry," *Syntroleum Corporation*, Tulsa, Oklahoma pp. 1–10 (1997).

"Petroleum Use and Greenhouse Gas Emissions of Selected Alternative Fuels," prepared by *EA Engineering, Science, and Technology, Inc.* 12 pgs. (1997).

A.J.V. Underwood, "Industrial Synthesis of Hydrocarbons from Hydrogen and Carbon Monoxide," *Industrial and Engineering Chemistry* vol. 32, pp. 449–454 (1940).

P. Norton et al., "Emmissions from Trucks using Fischer–Tropsch Diesel Fuel," *SAE The Engineering Resource For Advancing Mobility*, International Fall Fuels and Lubricants Meeting, San Francisco, CA, 12 pgs. (1998).

J. Erwin et al., "The Standing of Fischer–Tropsch Diesel in an Assay of Fuel Performance and Emissions," *Southwest Research Institute* pp. 1015–1053 (Pd. of Performance: Nov. 26, 1991 –Oct. 26, 1993).

* cited by examiner

Primary Examiner—J. Parsa
(74) Attorney, Agent, or Firm—Patrick J. S. Inouye

(57) ABSTRACT

Diesel fuels or blending stocks having excellent lubricity, oxidative stability and high cetane number are directly produced from synthesis gas over activated carbon supported cobalt based Fischer-Tropsch catalyst under the condition of temperature within the range of 120 to 400° C., reaction pressure within the range of 0.5 to 10.0 MPa, volume hourly space velocity of a mixture of hydrogen and carbon monoxide within the range of 100 to 5000, the mole ratio of hydrogen to carbon monoxide within the range of 1 to 4. Diesel fuels containing at least 95 wt % paraffins with an iso to normal ratio of about 0.03 to 0.3, <50 ppm (wt) of sulfur and nitrogen, less than about 2 wt % unsaturates, and about 0.001 to less than 0.3 wt % oxygen were obtained by separating the Fischer-Tropsch product into a lighter (180 to 245 ° C. fraction) and heavier fractions (245 to 380° C. fraction) utilizing a rough flash, and combining the 180 to 245° C. portion of the lighter product with the 245 to 380° C. fraction in desired ratios.

7 Claims, 1 Drawing Sheet

US 6,765,025 B2

Figure 1:
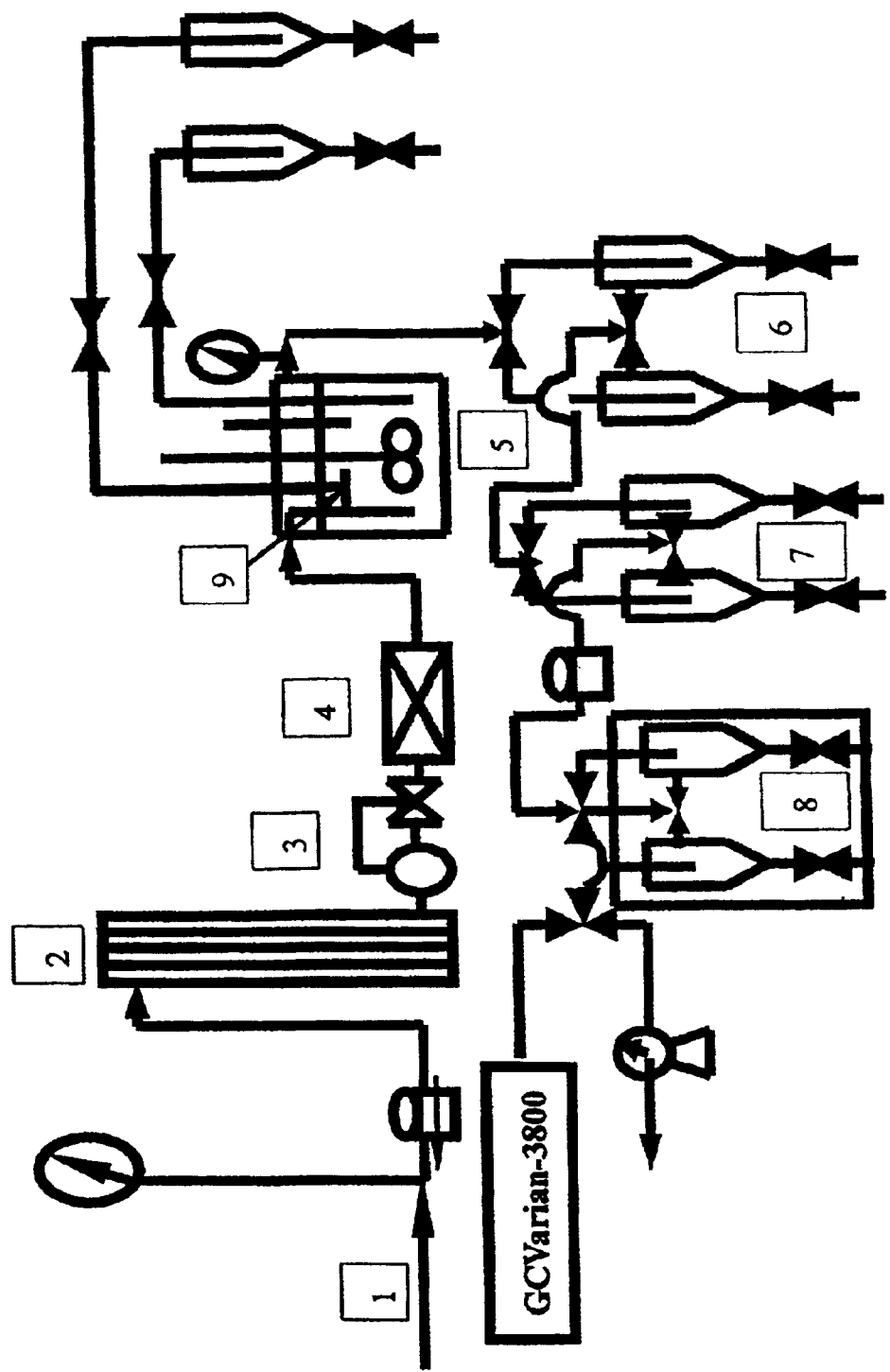

PROCESS FOR DIRECT SYNTHESIS OF DIESEL DISTILLATES WITH HIGH QUALITY FROM SYNTHESIS GAS THROUGH FISCHER-TROPSCH SYNTHESIS

1. FIELD OF THE INVENTION

This invention relates to distillates materials having high cetane number and useful as a diesel fuel with sulfur-free, nitrogen-free or aromatics-free, as well as the process for preparing the diesel distillates. More particularly, this invention relates to a process for preparing directly diesel distillates from synthesis gas over modified Fischer-Tropsch catalysts that cut off the heavier end of the Schultz-Flory distribution.

2. BACKGROUND OF THE INVENTION

Oil fields typically have deposits of natural gas associated with them. In remote locations where transport of this gas may not be economically attractive, gas conversion technology can be used for chemically converting natural gas to higher molecular weight hydrocarbons. Current gas conversion technologies rely on the chemical conversion of natural gas to synthesis gas, which is a mixture of carbon monoxide and hydrogen. Synthesis gas is then reacted in a catalyzed hydrocarbon synthesis process commonly known as Fischer-Tropsch synthesis.

Fischer-Tropsch reaction dates back to 1923, with the discovery of an efficient catalyst to convert synthesis gas into hydrocarbons mixtures. After coal-based synthetic fuels production during the World War II in Germany, and later in South Africa (SASOL), the energy crisis of 70's and 80's renewed the interest toward the conversion of the increasing remote natural gas reserves to liquid fuel (GTL).

Clean diesel distillates that contain no or nil sulfur, nitrogen, or aromatics, are, or will likely be in great demand as diesel fuel or in blending diesel fuel. Clean diesel distillates having relatively high cetane number are particularly valuable. Typical petroleum derived distillates are not clean, in that they typically contain significant amounts of sulfur, nitrogen, and aromatics, and they have relatively low cetane numbers. Clean diesel distillates can be produced from petroleum based distillates through severe hydrotreating at great expense. Such severe hydrotreating imparts relatively little improvement in cetane number and also adversely impacts the fuel's lubricity. Fuel lubricity, required for the efficient operation of fuel delivery system, can be improved by the use of costly additive packages.

U.S. Pat. No. 4,478,954 discloses a catalyst for the production of $C_2$~$C_4$ olefins from carbon monoxide and hydrogen consisting of 5~50 wt % iron metal and 20~90 wt % an activated carbon support, promoted by magnesium and chromium metals.

U.S. Pat. No. 4,542,122 states that a cobalt catalyst, especially a thoria promoted cobalt catalyst, formed by dispersing the cobalt, or cobalt and thoria, upon a titania or titania-containing support wherein the titania support is one having a rutile:anatase ratio of at least about 2:3. By passing methanol, or a mixture of carbon monoxide and hydrogen over the catalyst at reaction conditions, a distillate fuel consisted principally of a mixture of linear paraffin and olefins, particularly a $C_{10}^+$ distillate can be formed. The distillate can be further refined and upgraded to high quality fuels, and other products such as diesel fuel, jet fuel, lubes and specialty solvents, particularly premium middle distillate fuels of carbon numbers ranging from about $C_{10}$ to about $C_{20}$.

U.S. Pat. No. 4,579,986 discloses that synthesis gas is subjected to Fischer-Tropsch synthesis over a $Co/Zr/SiO_2$ catalyst and the $C_{20}^+$ fraction of the synthesized product is converted into linear $C_{10}$–$C_{20}$ olefins by mild thermal cracking.

Venter and Vannice (J. Catal., 1987, 103:450; Catal. Lett., 1990, 7:219; J. Phys. Chem., 1992, 96:9944) disclose that the higher activity and $C_2$~$C_4$ olefins selectivities was observed over an activated carbon supported iron based catalyst promoted by manganese and potassium promoters.

More recently, U.S. Pat. Nos. 6,274,029, 5,689,031, 5,378,348 disclose diesel fuels or blending stocks having excellent lubricity, oxidative stability and high cetane number are produced from non-shifting Fischer-Tropsch processes by separating the Fischer-Tropsch product into a lighter and heavier fractions, e.g., at about 370° C., subjecting the 370° C.$^+$ fraction to hydro-treating, and combining the 370° C.$^+$ portion of the hydrotreated product with the lighter fraction that has not been hydrotreated.

The production of clean, high cetane number distillates from Fischer-Tropsch waxes has been discussed in the open literature, but few literatures that reported the process for preparing directly diesel distillate with high quality from synthesis gas over an activated carbon supported cobalt based catalyst have appeared.

This invention will first show that the diesel distillates with sulfur-free, nitrogen-free or aromatics-free can be synthesized from synthesis gas over modified Fischer-Tropsch catalyst that cut off the heavier end of the Schulz-Flory distribution.

3. SUMMARY OF THE INVENTION

In accordance with this invention, a clean distillate useful as a fuel heavier than gasoline, e.g., useful as a diesel fuel or as a diesel fuel blend stock and having cetane number of at least about 60, preferably at least about 70, is produced, preferably direct from synthesis gas through Fischer-Tropsch process over an activated carbon supported cobalt based catalyst. In particular, there is provided a process for preparing directly diesel distillates from synthesis gas over modified Fischer-Tropsch catalysts that cut off the heavier end of the Schultz-Flory distribution.

4. BRIEF DESCRIPTION OF DRAWING

FIG. 1 is a block flow diagram representing the process of preparing directly diesel distillate from synthesis gas over a novel catalyst.

5. DESCRIPTION OF THE PREFERRED EMBODIMENTS

The objective of this invention is that provides a process for direct synthesis of diesel distillates with high quality from synthesis gas through Fischer-Tropsch synthesis, and provides equipment in which the Fischer-Tropsch reaction was conducted.

In order to realize the above objective, this invention provides a method for direct synthesis of diesel distillates with high quality from synthesis gas through Fischer-Tropsch synthesis, wherein synthetic fuels with diesel distillates as primary products are produced through one-step synthesis technique from synthesis gas, a mixture of hydrogen and carbon monoxide.

A mixture of hydrogen and carbon monoxide as principal component, the mole ratio of hydrogen to carbon monoxide within the range of 1 to 4, in synthesis gas can produced from a process of steam reforming or partial oxidation of natural gas or gas associated with oil or coal fields or light paraffins or from a process of coal gasification. The synthesis gas can be converted into diesel distillates over an activated carbon supported cobalt based catalyst under conditions of the reaction temperature within the range of 120 to 400° C., a reaction pressure within the range of 0.5 to 10.0 MPa, a mixture of hydrogen and carbon monoxide volume hourly space velocity within the range of 100 to 5000.

In addition, in the method according to the invention the synthetic fuels can be directly synthesized through the non-shifting Fischer-Tropsch reaction over an activated carbon supported cobalt based catalyst.

In addition, in the method according to the invention the synthetic fuels are useful as a fuel heavier than gasoline or as a blending component for a distillate fuel comprising: a 180 to 380° C. fraction direct synthesized from Fischer-Tropsch process and containing at least 95 wt % paraffins with an iso to normal ratio of about 0.03 to 0.3, <50 ppm (wt) of sulfur and nitrogen, less than about 2 wt % unsaturates, and about 0.001 to less than 0.3 wt % oxygen.

In addition, in the method according to the invention the synthetic fuels in which the oxygen is present primarily as $C_{12}^+$ linear alcohols was directly synthesized from synthesis gas; diesel fuels were characterized by a cetane number of at least 60 to 70; the content of nitrogen and sulfur in fuels is less than or equal to 15 ppm (wt).

In addition, in the method according to the invention the synthetic fuels in which the content of nitrogen and sulfur in fuels is less than or equal to 10 ppm (wt) was directly synthesized from synthesis gas.

The preferred catalysts comprise a Group VIII non-noble metal, e.g. cobalt, iron and nickel, preferably cobalt metal, in conjunction with a Group IVB metal promoter, e.g., zirconium, titanium, preferably zirconium, and a Group IIIB metal promoter, e.g., lanthanum, cerium, preferably cerium, or Group VIII metal promoter, e.g., ruthenium, platinum, rhodium, preferably ruthenium, supported on a porous support. The porous support is preferably an activated carbon, which is made from an almond core, or a cocoanut shell, or a palm tree wood, or a coal, preferably from an almond core. The catalyst is prepared by co-impregnating or stepwise-impregnating the metals from solutions onto the support, drying at room temperature for several days, then at 80 to 90° C. for 8 hours, and finally at 110 to 120° C. for 10 hours.

The Group VIII non-noble metal is present in amounts of about 20 wt % or less, preferably 5–15 wt %, while the Group IVB or IIIB or VIII metal promoter is usually present in lesser amounts, e.g., 1:2 to about 1:20 ratio respecting the Group VIII metal. A typical catalyst is shown below:

|    | | |
|----|---------------------|------------------|
|    | Co, wt %            | 7–15             |
| or | Zr, wt %            | 1.5–6.5          |
| or | Ti, wt %            | 1.5–6.5          |
| or | Ta, wt %            | 0.5–2            |
| or | Ce, wt %            | 0.5–3            |
| or | Ru, wt %            | 0.1–1.0          |
|    | Activated Carbon, % | 70–90            |
|    | Surface Area        | 800–1100 m²/gm   |
|    | Pour Volume         | 0.35–0.75 ml/gm  |
|    | Bulk Density        | 0.30–0.60 g/ml   |

In accordance with the process of the present invention, diesel distillates are directly prepared from synthesis gas (a mixture of carbon monoxide and hydrogen) through Fischer-Tropsch process, the preferred Fischer-Tropsch process is one that utilizes a non-shifting (that is, no water gas shift capability) catalyst, such as an activated carbon supported cobalt or ruthenium or mixtures thereof, preferably cobalt, and preferably a promoted cobalt, the promoter being zirconium or rhenium, preferably zirconium. The preferred Fischer-Tropsch catalyst is first reduced in a flow fixed bed reactor or a slurry reactor, preferably a slurry reactor, under reduction conditions of reduction temperature within the range of 250 to 500° C., reduction pressure within the range of 0.3 to 1.5 MPa, hydrogen volume hourly space velocity within the range of 100 to 1000, the rotate speed of an agitator in the slurry reactor within the range of 400 to 1000 r/min. The preferred Fischer-Tropsch reaction operation conditions are as follows: reaction temperature within the range of 120 to 350° C., reaction pressure within the range of 0.5 to 10.0 MPa, volume hourly space velocity of mixture of hydrogen and carbon monoxide within the range of 100 to 1500, the rotate speed of an agitator in the slurry reactor within the range of 400 to 1000 r/min, the mole ratio of hydrogen to carbon monoxide within the range of 1 to 3.

The products of the Fischer-Tropsch process are primarily paraffinic hydrocarbons. Ruthenium produces paraffins primarily boiling in the distillate range, i.e., $C_{10}$ to $C_{20}$, while conventional cobalt catalysts, e.g. $Co/SiO_2$, generally produce more of heavier hydrocarbons, e.g., $C_{20}^+$, and cobalt is a preferred Fischer-Tropsch catalytic metal for production of waxes. But an activated carbon supported cobalt based catalyst of this invention produces paraffins of $C_5$ to $C_{21}$ in the liquid oil phases, and most of paraffins are fell in the range of $C_{10}$ to $C_{19}$, it is belived that the shape selectivity of the pore size of Fischer-Tropsch catalyst restricts the wax formation, so the distribution of products deviates from Schultz-Folry distribution.

Diesel fuels generally have the properties of high cetane number, usually 50 or higher, preferably at least about 60, more preferably at least about 70, lubricity, oxidative stability, and physical properties compatible with diesel pipeline specifications.

The product of this invention may be directly used as a diesel fuel, or blended with other less desirable petroleum or hydrocarbon containing feeds of about the same boiling range. When used as a blend, the product of this invention can be used in relatively minor amounts, e.g., 10% or more, for significantly improving the final blended diesel product. Although, the product of this invention will improve almost any diesel product, it is especially desirable to blend this product with refinery diesel streams of low quality. Typical streams are raw or hydrogenated catalytic or thermally cracked distillates and gas oils.

By virtue of using the Fischer-Tropsch process, the recovered distillate has nil sulfur and nitrogen. These hereto-atom compounds are poisons for Fischer-Tropsch catalysts and are removed from the methane containing natural gas that is a convenient feed for the Fischer-Tropsch process. (Sulfur and nitrogen containing compounds are, in any event, in exceedingly low concentrations in natural gas). Further, the process does not make aromatics, or as usually operated, virtually no aromatics are produced. Some olefins are produced since one of the proposed pathways for the production of paraffins is through an olefinic intermediate. Nevertheless, olefin concentration is usually quite low.

There would also be an interest in performing the Fischer-Tropsch and the upgrading reaction of F-T products in a single step. There have been attempts to do so by using cobalt/zeolites catalysts, but the shape selectivity of zeolite does not operate on long chain paraffins and leads the transformation of olefinic intermediates into aromatics, which are not desired in the final fuels.

Oxygenated compounds including alcohols and some acids are produced during Fischer-Tropsch processing, the present process produces small amounts of oxygenates, such as alcohols, usually concentrated in aqueous phase of Fischer-Tropsch process.

By virtue of the processing scheme disclosed in this invention the lighter, 180–350° C. fraction (gone with the elution gas of Fischer-Tropsch reaction, then condensed in the trap) is not subjected to any hydrotreating, can be used directly as diesel fuel. In the absence of hydrotreating of the lighter fraction, the small amount of oxygenates, primarily linear alcohols, in this fraction are preserved.

The oxygen compounds that are believed to promote lubricity may be described as having a hydrogen bonding energy greater than the bonding energy of hydrocarbons (the energy measurements for various compounds are available in standard references); the greater the difference, the greater the lubricity effect. The oxygen compounds also have a lipophilic end and a hydrophilic end to allow wetting of the fuel.

Preferred oxygen compounds, primarily alcohols, have a relatively long chain, i.e., $C_{12}^+$, more preferably $C_{12}$~$C_{24}$ primary linear alcohols.

While acids are oxygen-containing compounds, acids are corrosive and are produced in quite small amounts during Fischer-Tropsch processing at non-shift conditions. Acids are also di-oxygenates as opposed to the preferred mono-oxygenates illustrated by the linear alcohols. Thus, di or poly-oxygenates is usually undetectable by infrared measurements and are, e.g., less than about 15 wt. ppms oxygen as oxygen.

Non-shifting Fischer-Tropsch reactions are well known to those skilled in the art and may be characterized by conditions that minimize the formations of $CO_2$ by-products. These conditions can be achieved by a variety of methods, including one or more of the following: operating at relatively low CO partial pressures, that is, operating at hydrogen to CO ratios of at least about 1.7/1, preferably about 1.7/1 to about 2.5/1, more preferably at least about 1.9/1, and in the range 1.9/1 to about 2.3/1, all with an alpha of at least about 0.68, preferably at least about 0.78; temperatures of about 195 to 295° C., preferably 220 to 265° C.; using catalysts comprising activated carbon supported cobalt or ruthenium as the primary Fischer-Tropsch catalytic agent.

The amount of oxygenates present, as oxygen on a water free basis is relatively small to achieve the desired lubricity, i.e., at least about 0.001 wt % oxygen (water free basis), preferably 0.001–0.3 wt % oxygen (water free basis), more preferably 0.0025–0.3 wt % oxygen (water free basis).

The following examples will serve to illustrate, but not limit, this invention.

This invention will be more detailed explained by referring to the drawing. Synthesis gas, hydrogen and carbon monoxide, in an appropriate ratio, contained in line 1 is first purified by a purifier 2 where a silica gel, a 5A molecular sieves and an activated carbon are filled, then is fed to a Fischer-Tropsch reactor 5, preferably a slurry reactor, before being fed into a reactor, is heated through the pre-heater 4 and the velocity of stock feed is controlled by mass flow controller 3, and product is recovered in traps 6, 7 and 8, respectively. The lighter fraction goes through hot separator 6 and a 180–245° C. fraction is recovered, in trap 6, while an 80–180° C.-fraction is recovered in trap 7, and a 0–80° C. fraction is recovered in trap 8. The heavier (e.g., 245° C. fraction) still stays in the slurry tank, which can be withdrawn through the filter 9 (50 μm) with slurry liquid (paraffin liquid waxes) together at the start of run periodically.

Hydrogen and carbon monoxide synthesis gas ($H_2$/CO= 1.95–2.15) were converted to middle distillates paraffins in a slurry Fischer-Tropsch reactor. The catalyst utilized for the Fischer-Tropsch reaction was an activated carbon supported cobalt/zirconium catalyst. The reaction conditions were 230 to 245° C., 2.0 to 2.5 MPa, and a linear velocity of 12 to 17.5 cm/sec. The alpha of the Fischer-Tropsch synthesis step was 0.785. The paraffinic Fischer-Tropsch product was then isolated in four nominally different boiling streams, separated utilizing a rough flash. The four approximate boiling fractions were: 1) the 0–80° C. $C_5^+$ boiling fraction, designated below as F-T Cold Separator Liquids; 2) The 80–180° C. boiling fraction designated below as F-T Heated Separator Liquids; 3) the 180 to 245° C. fraction designated below as F-T Hot Separator Liquids; 4) the heavier (e.g., 245 to 320° C. fraction) still stays in the slurry tank, which can be withdrawn through the filter (50 μm) with slurry liquid (paraffin liquid waxes at the beginning, after that the withdrawn liquid was the 245 to 320° C. fraction liquid product) periodically.

EXAMPLE 1

Forty wt. % of the 180 to 245° C. fraction from F-T Hot Separator and sixty wt. % of the withdrawn heavier liquid were combined and rigorously mixed. Diesel Fuel A was the 180~380° C.-boiling fraction of this blend, Fuel A is representative of a typical diesel fuel directly synthesized from activated carbon supported cobalt based Fischer-Tropsch catalyst, well known in the art.

EXAMPLE 2

Forty-five wt. % of the 180 to 245° C. fraction from F-T Hot Separator and fifty-five wt. % of the withdrawn heavier liquid were combined and rigorously mixed. Diesel Fuel B was the 180~380° C. boiling fraction of this blend, Fuel B is a representative example of this invention.

EXAMPLE 3

Diesel Fuels C and D were prepared by distilling Fuel B into two fractions. Diesel Fuel C represents the 180 to 260° C. fraction of Diesel Fuel B. Diesel Fuel D represents the 260 to 380° C. fraction of Diesel Fuel B.

EXAMPLE 4

50 grams of Diesel Fuel B was contacted with 16 grams of silico-aluminate zeolite: 13×molecular sieve, 8–12 mesh beads. Diesel Fuel E is the filtrated liquid resulting from this treatment. This treatment effectively removes alcohols and other oxygenates from the fuel.

EXAMPLE 5

Diesel Fuel F is a hydrotreated petroleum stream composed of approximately 40% cat distillate and 60% virgin distillate. It was subsequently hydrotreated in a commercial hydrotreater. The petroleum fraction has a boiling range of 180 to 430° C. contains 655 ppm sulfur (x-ray), and 40% FIA aromatics. Diesel Fuel F represents a petroleum base case for this invention.

EXAMPLE 6

Diesel Fuel G was prepared by combining equal amounts of Diesel Fuel B with a Diesel Fuel F. Diesel Fuel G should contain 590 ppm total oxygen (neutron activation), 90 ppm 260° C. boiling primary alcohols the (GC/MS), and signal for primary alcohols indicates 340 ppm total oxygen as primary alcohols ($^1$H NMR; 180 to 380° C.). Diesel Fuel G represents an additional example for this invention where both HCS and petroleum distillates are used to comprise the diesel fuel.

EXAMPLE 7

Oxygenate, dioxygenate, and alcohol composition of Diesel Fuels A, B, and E were measured using Proton Nuclear Magnetic Resonance ($^1$H-NMR), Infrared Spectroscopy (IR), and Gas Chromatography/Mass Spectrometry (GC/MS). $^1$H-NMR experiments were done using a Bruker DRX400 Spectrometer. Quantitative data were obtained by measuring the samples, dissolved in $CDCl_3$, at ambient temperature, using pulse width of 2.9 .mu.s (45 degree tip angle), delay of 60 s, and 64 scans. Tetramethylsilane was used as an internal reference in each case and dioxane was used as an internal standard. Levels of primary alcohols, secondary alcohols, esters and acids were estimated directly by comparing integrals for peaks at 3.6 (2H), 3.4 (1H), 4.1 (2H) and 2.4 (2H) ppm respectively, with that of the internal standard. IR Spectroscopy was done using a Bruker EQUINOX 55 spectro-meter. Samples were prepared by placing them in a KBr fixed path length cell (nominally 1.0 mm) and acquisition was done by adding 4096 scans a 0.3 $cm^{-1}$ resolution. Levels of dioxygenates, such as carboxylic acids and esters, were measured using the absorbance at 1720 and 1738 $cm^{-1}$, respectively. GC/MS were performed using Agilent 5973 N MS/6890GC. Selected ion monitoring of m/z 31 ($CH_3O^+$) was used to quantify the primary alcohols. An external standard was made by weighing $C_2$–$C_{14}$, $C_{16}$ and $C_{18}$ primary alcohols into a mixture of $C_8$–$C_{16}$ normal paraffins. Olefins were determined using Bromine Index, as described in ASTM D 2710. Results from these analyses are presented in Table 1. Diesel Fuel A and B which contain a significant amount of oxygenates as linear, primary alcohols. A significant fraction of these are the important $C_{12}$–$C_{18}$ primary alcohols. It is these alcohols that impart superior performance in diesel lubricity. Molecular sieve treatment (Diesel Fuel E) also is effective at removing the alcohol contaminants. None of these fuels contain significant levels of dioxygenates, such as carboxylic acids or esters.

TABLE 1

Oxygenate, and dioxygenate (carboxylic acids, esters) composition of Diesel Fuel A, Diesel Fuel B, and the Molecular Sieve Treated, Diesel Fuel E

|  | Diesel Fuel A | Diesel Fuel B | Diesel Fuel E |
|---|---|---|---|
| wt ppm Oxygen in dioxygenates, (carboxylic acids, esters) - (IR) | None Detected | None Detected | None Detected |
| wt ppm Oxygen in $C_5$–$C_{18}$ primary alcohols - ($^1$H-NMR) | None Detected | None Detected | None Detected |
| wt ppm Oxygen in $C_5$–$C_{18}$ primary alcohols - (GC/MS) | 6.3 | 7.7 | None Detected |
| wt ppm Oxygen in $C_{12}$–$C_{18}$ primary alcohols - (GC/MS) | 4.3 | 6.5 | None Detected |
| Total Olefins - mmol/g (Bromine Index, ASTM D 2710) | 0.008 | 0.006 | — |

EXAMPLE 8

Diesel Fuels A-G were all tested using a standard Ball on Cylinder Lubricity Evaluation (BOCLE), this test is based on ASTM D 5001. Results are reported in Table 2 as percents of Reference Fuel 2, described in Lacey.

TABLE 2

BOCLE results for Fuels A–G. Results reported as percents of Reference Fuel 2 as described in

| Diesel Fuel | % Reference Fuel 2 |
|---|---|
| A | 91.8 |
| B | 90.9 |
| C | 43.7 |
| D | 99.7 |
| E | 35.6 |
| F | 86.0 |
| G | 87.4 |

The Diesel Fuels A, and B exhibits significantly superior lubricity properties. Diesel Fuel E was prepared by separating oxygenates away from Diesel Fuel B through adsorption by 13×molecular sieves. Diesel Fuel E exhibits very poor lubricity indicating the linear $C_5$–$C_{24}$ primary alcohols are responsible for the high lubricity of Diesel Fuel B. Diesel Fuels C and D represent the 180 to 260° C. and the 260 to 380° C. boiling fractions of Diesel Fuel B, respectively. Diesel Fuel C contains the linear $C_5$–$C_{11}$ primary alcohols that boil below 260° C., and Diesel Fuel D contains the $C_{12}$–$C_{24}$ primary alcohols that boil between 260 to 380° C. Diesel Fuel D exhibits superior lubricity properties compared to Diesel Fuel C, and is in fact superior in performance to Diesel Fuel B from which it is derived. This clearly indicates that the $C_{12}$–$C_{24}$ primary alcohols that boil between 260 to 380° C. are important to producing a high lubricity saturated diesel fuel. Diesel Fuel F is representative of petroleum derived low sulfur diesel fuel, and although it exhibits reasonably high lubricity properties it is not as high as the highly paraffinic Diesel Fuel B. Diesel Fuel G is the 1:1 blend of Diesel Fuel B and Diesel Fuel F and it exhibits improved lubricity performance compared to Diesel F. This indicates that the highly paraffinic Diesel Fuel B is not only a superior neat fuel composition, but also an outstanding diesel-blending component capable of improving the properties of petroleum derived low sulfur diesel fuels.

References Cited [Referenced By]

U.S. Patent Documents

| 4478954 | October 1984 | Connolly, et al. | 518/700 |
| 4542122 | September 1985 | Payne, et al. | 502/300 |
| 4579986 | April 1986 | Sie | 208/108 |
| 4992159 | February 1991 | Coby, et al. | 585/734 |
| 4992406 | February 1991 | Manldin, et al. | 502/325 |
| 5324335 | June 1994 | Benham, et al. | 44/436 |
| 5378348 | January 1995 | Davis, et al. | 208/27 |
| 5522983 | June 1996 | Cash, et al. | 208/591 |
| 5689031 | November 1997 | Berlowitz, et al. | 585/730 |
| 6274029 | August 2001 | Wittenbrink, et al. | 208/15 |

Foreign Patent Document

| 0153782 | September 1985 | EP |
| 0515270A1 | November 1992 | EP |
| 0569228B1 | June 1998 | EP |
| 1499570 | February 1978 | GB |
| 2302561 | October 1991 | JP. |
| 94/28095 | December 1994 | WO. |
| 97/21787 | June 1997 | WO. |

Other References

Morgan et al, "Some Comparative Chemical, Physical and Compatibility Properties of Sasol Slurry Phase Distillate Diesel Fuel", SAE No. 982488 (1998), pp. 1–9.

Agee, "A New Horizon For Synthetic Fuels", World Conference on Transportation Quality Oct. 6–8, 1996.

Norton et al, "Emissions from Trucks using Fischer-Tropsch Diesel Fuel", SAE No. 982526, pp. 1–10 (1998).

Erwin et al., "The Standing of Fischer-Tropsch Diesel in an Assay of Fuel Performance and Emissons", Southwest Research Institute, Contract No. NREL SUB YZ-2-113215-1 (Oct. 26, 1993).

T. L. Ullman, "Effects of Cetane Number, Cetane Improver, Aromatics, and Oxygenates on 1994 Heavy-Duty Diesel Engine Emission", SAE Paper 841020.

Underwood, "Industrial Synthesis of HC from Hydrogen and Carbon Monoxide", Ind. & Eng. Chemistry, vol. 32, No. 4, pp. 450–454.

Shah et al, USDOE/USDOC NTIS, UOP, Inc., Fischer-Tropsch Wax Characterization and Upgrading—Final Report, DE 88-014638, June 1988 ("UOP Report").

What is claimed is:

1. A method for converting directly synthesis gas to hydrocarbons with high diesel distillates content through Fischer-Tropsch process, wherein:

(1) the synthetic fuels with diesel distillates as primary products are produced through one-step synthesis technique from synthesis gas;

(2) synthesis gas is composed of hydrogen and carbon monoxide with the mole ratio of hydrogen to carbon monoxide within the range of 1 to 4;

(3) activated carbon supported cobalt based catalysts were employed;

(4) synthesis conditions comprise reaction temperature within the range of 120 to 400° C., reaction pressure within the range of 0.5 to 10.0 MPa, volume hourly space velocity of mixture of hydrogen and carbon monoxide within the range of 100 to 5000.

2. A method of claim 1, wherein said Fischer-Tropsch process is a non-shifting Fischer-Tropsch process over an activated carbon supported cobalt based catalyst.

3. A method of claim 1, wherein the diesel distillates useful as a diesel fuel heavier than gasoline or as a blending component for a distillate fuel comprising: 180 to 380° C. fraction directly synthesized from Fischer-Tropsch process and containing at least 95 wt % paraffins with an iso to normal ratio of about 0.03 to 0.3, <50 ppm (wt) of sulfur and nitrogen, less than about 2 wt % unsaturates, and about 0.001 to less than 0.3 wt % oxygen.

4. The method of claim 3, wherein the oxygen is present primarily as $C_{12}$+linear alcohols.

5. The method of claim 3, wherein the diesel fuels are characterized by a cetane number of at least 60 to 70.

6. The method of claim 3, wherein the content of nitrogen and sulfur in fuels is less than or equal to 15 ppm (wt).

7. The method of claim 6, wherein the content of nitrogen and sulfur is less than or equal to 10 ppm (wt).

* * * * *